H. W. SCHATZ.
DRILLING MACHINE.
APPLICATION FILED OCT. 22, 1917.

1,297,257.

Patented Mar. 11, 1919.
5 SHEETS—SHEET 1.

Inventor:
Herman W. Schatz,

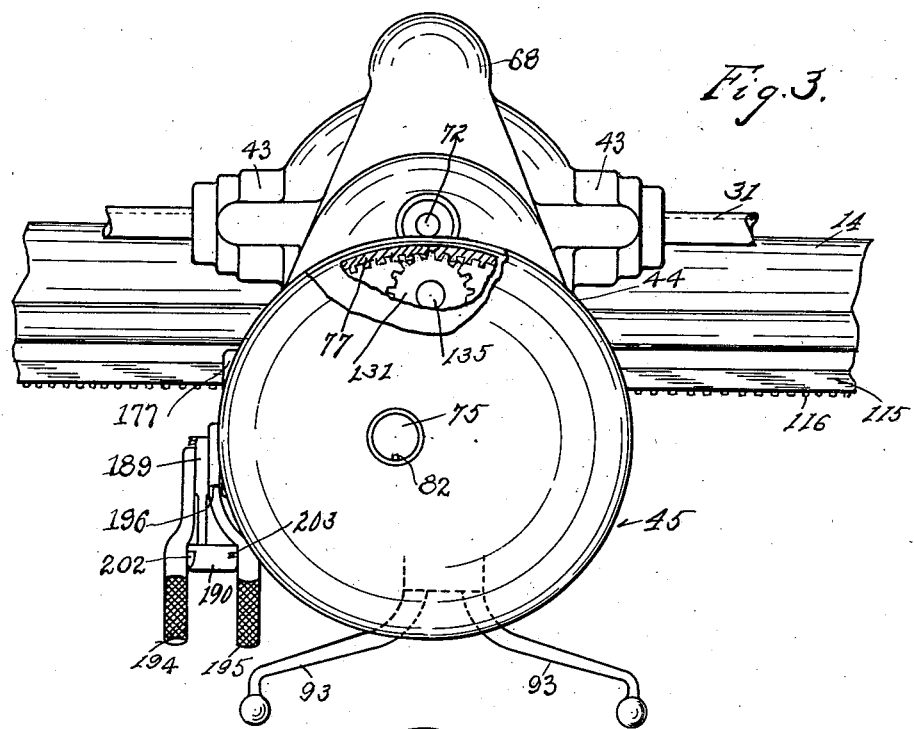
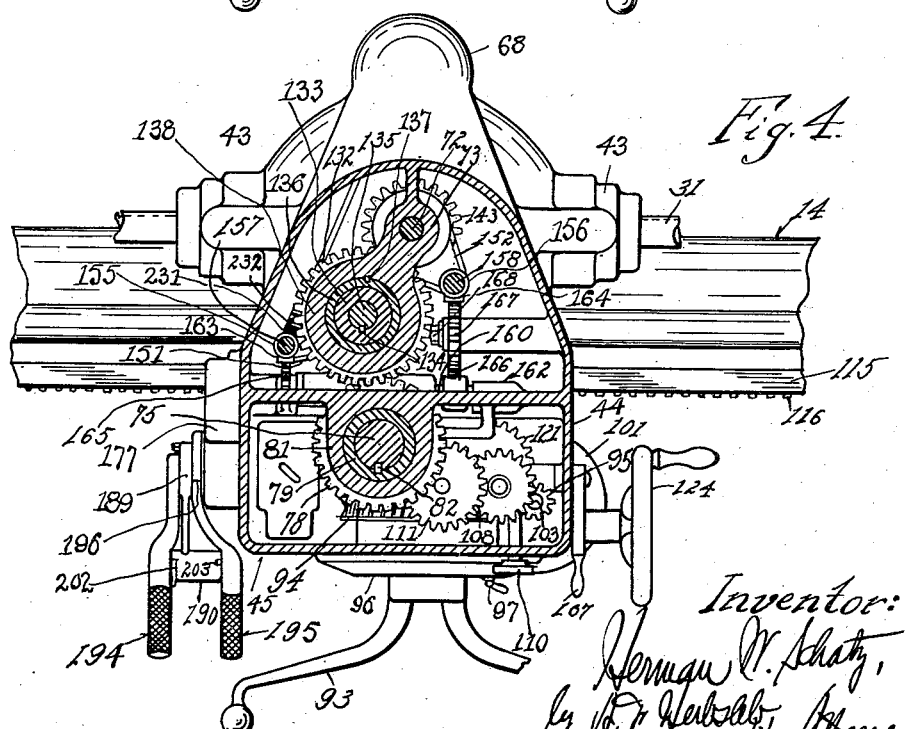

H. W. SCHATZ.
DRILLING MACHINE.
APPLICATION FILED OCT. 22, 1917.
1,297,257.
Patented Mar. 11, 1919.
5 SHEETS—SHEET 3.
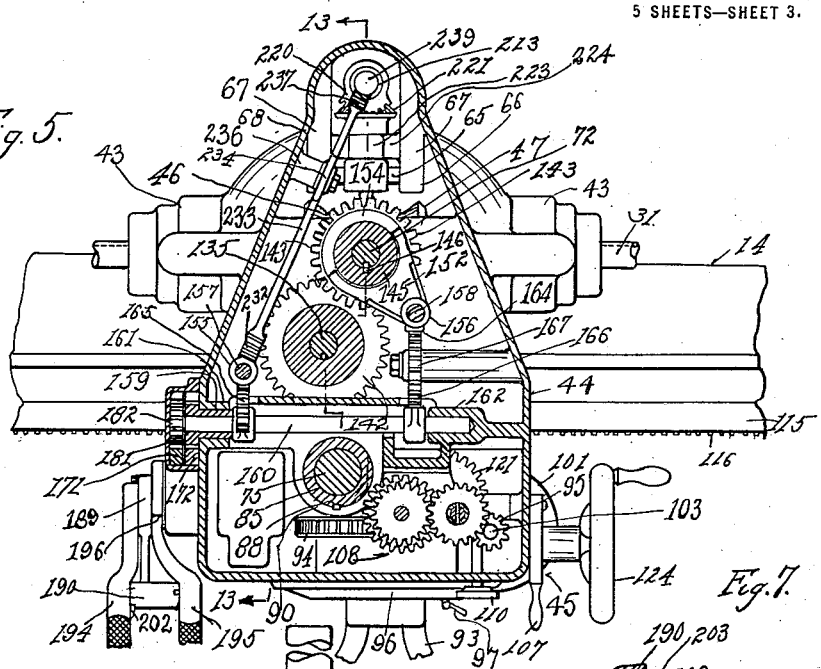

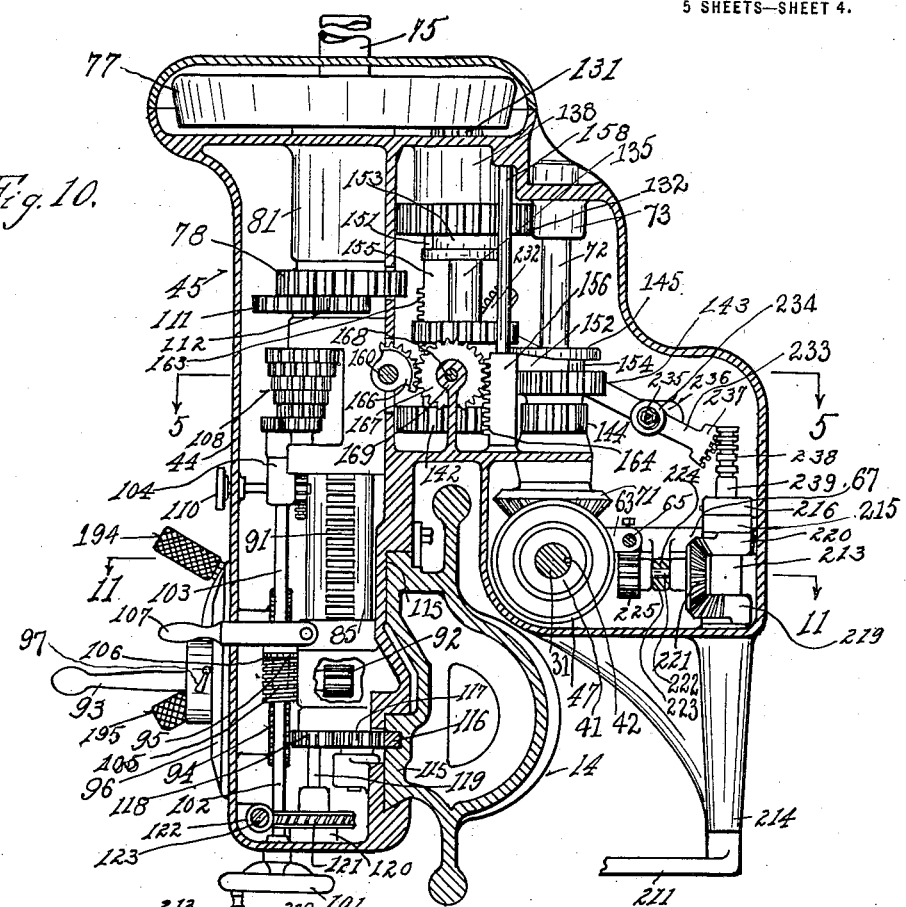
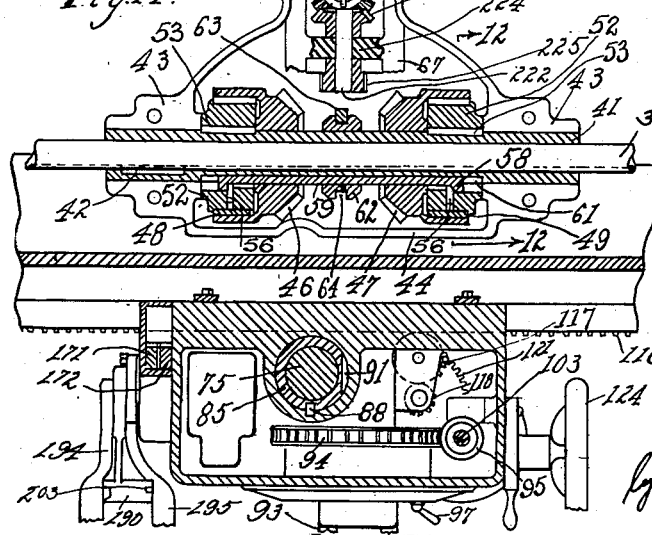
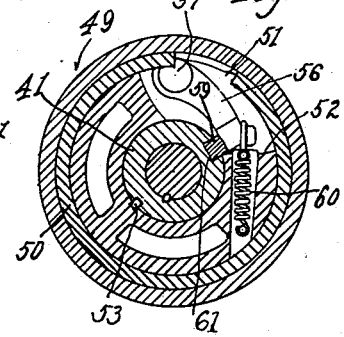

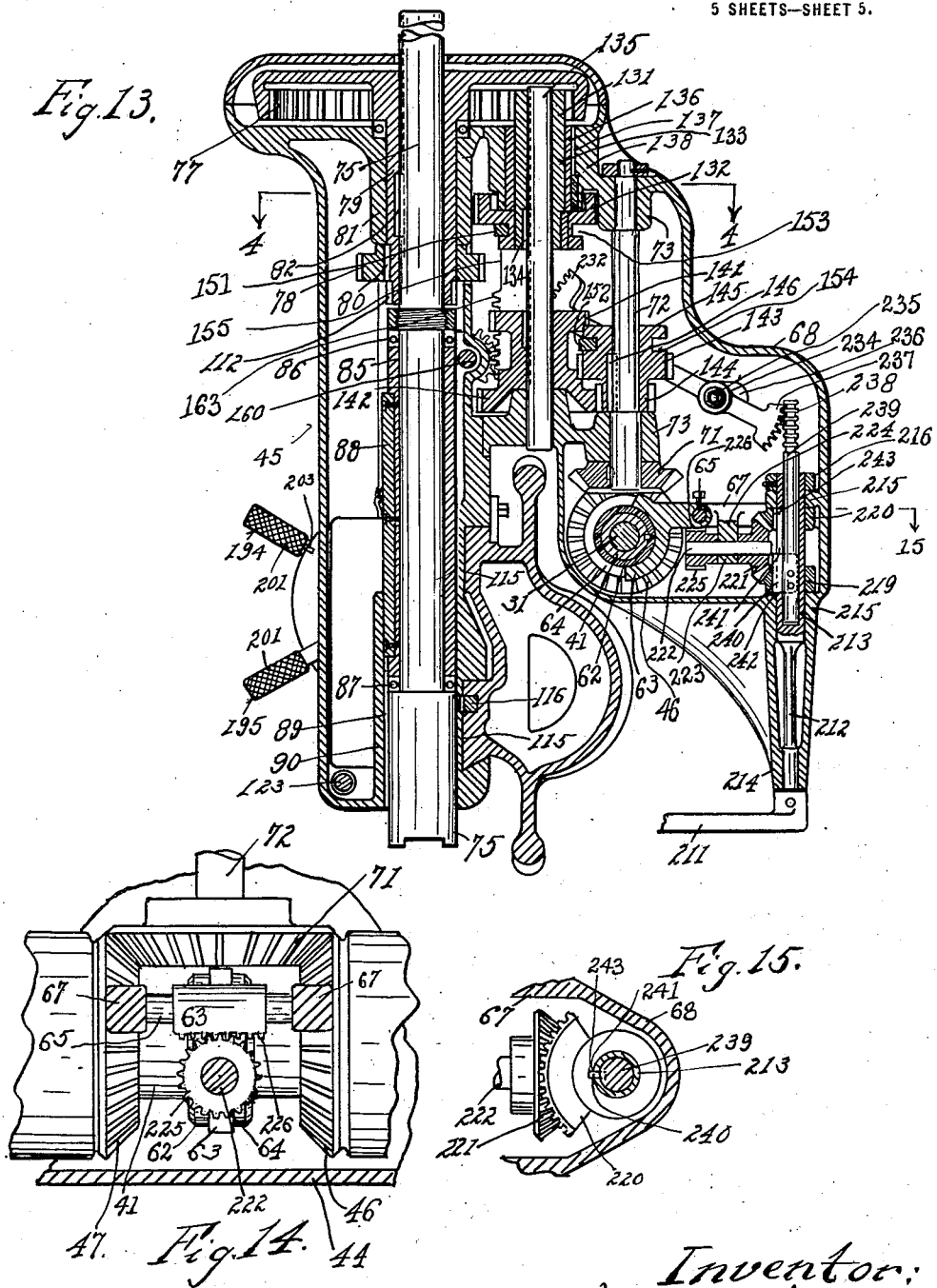
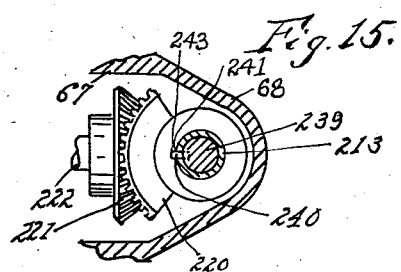

UNITED STATES PATENT OFFICE.

HERMAN W. SCHATZ, OF NORWOOD, OHIO, ASSIGNOR TO THE AMERICAN TOOL WORKS COMPANY, OF CINCINNATI, OHIO, A CORPORATION OF OHIO.

DRILLING-MACHINE.

1,297,257.   Specification of Letters Patent.   Patented Mar. 11, 1919.

Application filed October 22, 1917. Serial No. 197,866.

*To all whom it may concern:*

Be it known that I, HERMAN W. SCHATZ, a citizen of the United States, residing at Norwood, in the county of Hamilton and State of Ohio, have invented certain new and useful Improvements in Drilling-Machines, of which the following is a specification.

My invention is an improvement on the drilling machine shown, described and claimed in the application of applicant and Augustus M. Soss, for patent on improvements in drilling machines, filed in the United States Patent Office September 10, 1917, as Serial No. 190,653.

In this latter application a drilling machine is exemplified in which an internal gear and an external gear are received about the spindle for rotating the same, a pair of driving gears being arranged to be placed in coöperative driving relation selectively with the internal gear and the external gear about the spindle, and so arranged in one of the exemplifications of the invention that, assuming the driving gears to be rotating in the same direction, when one of said driving gears is operatively connected with the internal gear, the rotation of the spindle is in one direction, and when the other of the driving gears is in operative connection with the external gear about the spindle, the rotation of the spindle is in the opposite direction.

In practice it is customary for the operator to shift an operating handle for causing rotation of the drill-spindle in one direction when feeding the drill-spindle in its advancing or cutting axial movement, and to shift said handle in the opposite direction for a reverse rotation and feeding movement of the drill-spindle.

If now the spindle is rotated in one direction when one of the driving gears is in operative connection with the internal gear, and is rotated in the opposite direction when the other of said driving gears is in operative connection with the external gear about the spindle, it would be necessary for the operator to remember or have in mind which of the driving gears is in operative relation, in order to know in which direction to move the operating handle for a given direction of rotation or feeding movement of the spindle. For a given rotation of the spindle it would be necessary, when the above relation of parts is employed, to move the handle in one direction for an advance rotation of the spindle when the driving gear is in operative relation with the internal gear about the spindle, and to move said operating handle in the opposite direction for said given advance rotation of the spindle, when the other of said driving gears is in operative relation with the external gear about the spindle.

In order to avoid the incident annoyance and possible mistakes and the mental calculations which are incident to such structure and arrangement, I have provided means, effected by the movement of the operating handle, for controlling the driving means, in order that the direction of rotation of the spindle will be the same on a given direction of movement of the operating handle, regardless of whether driving connection is made by the internal gear or the external gear about the spindle.

It is the object of my invention, therefore, to provide means controlled by an operating part for effecting a similarity of direction of rotation of the drill-spindle by a given direction of movement of the operating part, regardless of whether the driving means has operative connection with the spindle by means of the internal gear or the external gear; further, to provide novel controlling means for the driving relations for the drill-spindle, whereby a change in relation in the driving means effects a change in relation in the controlling means for effecting similarity in rotation of the spindle by given movements of the operating part; further, to provide control means and driving means for a drill-spindle whereby shifting of an element of the driving means causes shifting of an element in the control means for changing the control effect of the control means on the driving means.

The invention will be further readily understood from the following description and claims, and from the drawings, in which latter:

Fig. 3 is a plan view of the drill-head and drill-arm, partly broken away.

Fig. 4 is a horizontal plan section of the same, taken in the plane of the line 4—4 of Fig. 13.

Fig. 5 is a plan section of the same, taken in the plane of the line 5—5 of Fig. 10.

Fig. 6 is a side elevation of my improved device, with part of the casing removed for better illustration of parts.

Fig. 7 is a sectional detail of one of the shifting handles, taken on the line 7—7 of Fig. 6.

Fig. 8 is an axial sectional detail of the shifting means, taken in the plane of the line 8—8 of Fig. 6.

Fig. 9 is an axial sectional detail of the shifting means, taken on the line 9—9 of Fig. 6.

Fig. 10 is a side elevation of my improved device, with the casing partly broken away for better illustration of parts.

Fig. 11 is a plan section of the same, taken in the plane of the line 11—11 of Fig. 10.

Fig. 12 is a cross-section of one of the driving clutches, taken in the plane of the line 12—12 of Fig. 11.

Fig. 13 is a vertical section of my improved device, taken in the plane of the line 13—13 of Fig. 5.

Fig. 14 is a sectional detail of the control means, taken in the plane of the line 14—14 of Fig. 6; and, Fig. 15 is a plan section of a detail of the same, taken in the plane of the line 15 of Fig. 13.

Figure 1:
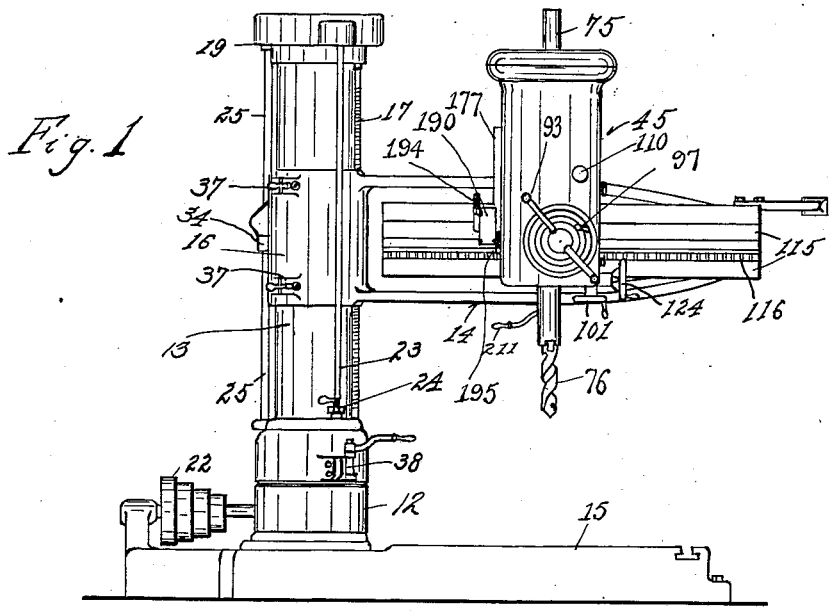
Figure 1 is a front elevation of a drilling machine embodying my invention.
Figure 2:
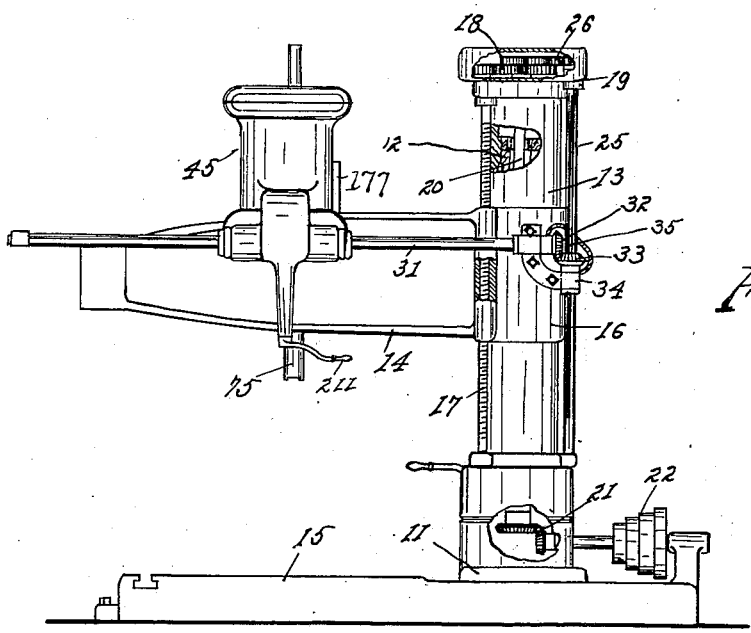
Fig. 2 is a rear elevation of the same.

My invention is exemplified in a radial drill comprising a base 11, from which a post 12 extends upwardly, a column 13, shown as a rotatable column, being received about the post for positioning the drill-arm 14 in radial position with relation to a table 15. (See Figs. 1 and 2.) The drill-arm 14 comprises a bearing 16 about the column, and is arranged to be raised and lowered on the column by means of a screw-rod 17, rotatable selectively in reverse directions by gearing 18 in the cap 19 of the column, the latter gearing being rotatable by an upright shaft 20 in the post, driven by gearing 21, preferably at selective speeds, as by a step pulley 22, or other suitable means.

Reverse rotations are imparted to the screw-rod by means of selective relations in the gearing 18, effected by a rocker-rod 23 suitably supported on the column and operated by a handle 24. A shaft 25 extends lengthwise of the column, and is arranged to be driven at selective speeds by upright shaft 20 by usual gearing 26 in the cap 19.

A cross-shaft 31 has a bevel-gear 32 fast thereon, which is meshed by a bevel-gear 33, rotating in a bearing 34 secured to the drill-arm bearing, and having spline-connection 35 with upright shaft 25. The arm is arranged to be clamped in adjusted positions to the column by means of clamps 37. The column is arranged to be clamped to the post when in adjusted position, by means of a clamp 38.

The cross-shaft 31 is arranged to rotate and to feed the drill-spindle at selective speeds and in selective directions. (See Figs. 3, 4, 5, 6, 10 and 11.) A sleeve 41 slides lengthwise of the cross-shaft and is rotatable therewith, having spline-connection 42 with said sleeve. The sleeve is journaled in bearings 43 in the casing 44 of a drill-head 45. Opposed bevel-gears 46, 47, are arranged to be selectively connected with the sleeve, as by means of friction-clutches 48, 49, each of which comprises a friction-band 50, one end of which has lodgment against a stop 51 on an inner member 52 of the friction-clutch, the inner member being keyed by a key 53 to the sleeve.

A lever 56 is pivoted to the inner member and has a key 57 thereon which engages the opposite end of the friction-band for expanding the same, the engagement being caused by means of a cam-face 58 on a sliding key 59, the lever being normally retracted by a spring 60. (See Figs. 11 and 12.) The sliding key is moved lengthwise in a groove 61 in the sleeve, by means of a collar 62 secured thereto, the collar being arranged to be shifted laterally by means of a fork 63, received in an annular groove 64 in said collar, and secured to a rod 65 slidable lengthwise in bearings 66 in lugs 67 of a rear housing 68 of the drill-head.

When the collar 62 and sliding key 59 are moved in one direction, operative connection is made between the cross-shaft 31 and the bevel-gear 46, and when the sliding key is moved in the opposite direction, operative connection is made between said cross-shaft and the bevel-gear 47. When the collar and key are in intermediate positions, both said bevel-gears are at rest, the shaft and sleeve rotating idle within the same. A bevel-gear 71 is in mesh with both of said opposed bevel-gears 46, 47, for rotating the shaft 72 in opposite directions, depending on which of the bevel-gears 46, 47, is in operative relation with its drive-shaft. (See Fig. 10.) The bevel-gear 71 is fast on a shaft 72 journaled in bearings 73 of the drill-head, and is arranged to transmit motion preferably at a plurality of speeds to the drill-spindle.

The drill-spindle is shown at 75, and is arranged to have a suitable drill 76 received therein. (See Figs. 1, 3, 4, 10 and 13.) The drill-spindle is exemplified as having an internal gear 77 and an external gear 78 received thereabout for driving the same, the internal gear being exemplified as having a bushing 79 extending therefrom, the external gear being secured to the bushing by a key 80. The bushing is rotatable in a bearing 81 on the drill-head. The spindle has axial movement in the bushing and is caused to rotate therewith, as by a spline-connection 82. A rack-sleeve 85 is received about the spindle, the spindle rotating therein, end-abutment bearings 86, 87, being between the sleeve and the spindle. The sleeve is provided with a key 88 having lengthwise movement in a groove 89 of a bearing 90 in which the sleeve has axial movement.

The sleeve is provided with a rack 91, which is meshed by a pinion 92, arranged to be rotated in suitable manner, either for quick axial positioning movement of the spindle by means of handles 93, or for a feeding movement of the spindle, through the medium of a worm-wheel 94, with which a worm 95 meshes. The handles are on a face-plate 96, normally clamped to the worm-wheel by a clamp operated by a handle 97, the clamp being released when employing the handle, as more fully described in the aforesaid application. (See Figs. 5, 10 and 11.)

The worm is arranged to be rotated manually by a hand-wheel 101 fixed to a shaft 102, to which the worm is fixed, or by power, by means of a shaft 103 journaled in a bearing 104 of the drill-head and in a bore 105 in the worm-wheel, and arranged to be selectively connected with the worm by means of a clutch 106 operated by a handle 107.

The shaft 103 is arranged to be rotated at selective speeds by suitable coacting nests of gears, exemplified at 108, the selective speeds in which are controlled by a hand-wheel 110. The variable speed device is arranged to be rotated by a gear 111, which meshes with a gear 112 fast with the bushing 79.

Lateral movement of the drill-head on the arm in either direction is caused by suitable means, as by having the drill-head slide laterally on guides 115 on the arm, effected by means of a rack 116, (see Figs. 1, 10 and 11), extending lengthwise of the arm, meshed by a pinion 117, with which a gear 118 meshes, the latter being on a shaft 119, journaled in a bearing 120 in the drill-head, and having a worm-wheel 121 fast thereon. The worm-wheel is meshed by a worm 122, on a shaft 123, journaled in the drill-head, and having an operating hand-wheel 124 fixed thereto.

Suitable means are provided for driving the internally toothed and externally toothed gear about the drill-spindle at selective speeds, exemplified as accomplished by means of a driving gear 131, arranged to drive the internal gear, and by means of a driving gear 132, arranged to drive the external gear about the spindle. (See Figs. 3, 4, 5, 6, 10 and 13.) The driving gears are on a sleeve 133, having spline-connection 134 with a shaft 135. The sleeve has bearing in a bushing 136, which has spline-connection 137 with a bearing 138 in the drill-head, the gear or pinion 131 being arranged to be received in the latter bearing when the gear 132 is caused to mesh with the external gear 78 about the drill-spindle. Axial movement of the driving gears is effected by means to be presently described.

The driving gears are arranged to be rotated at selective speeds, effected by variable speed mechanism, instanced as comprising a pair of spaced-apart gears 141, 142, fixed to the shaft 135. Gears 143, 144, are on a sleeve 145, which has spline-connection 146 with the shaft 72.

Selective driving connections between the shaft 135 and the drill-spindle, and between shafts 135 and 72, are preferably independently controlled by mechanism adapted to be manually actuated, (see Figs. 1, 3, 4, 5, 6, 7, 8, 9 and 10.) Instancing this arrangement, the axially movable sleeves 133, 145, of the respective selective driving connections, are shifted axially by shifting forks 151, 152, received in suitable annular grooves 153, 154, formed in the sleeves 133, 145, respectively. The shifting forks are exemplified as extending laterally from shifting sleeves 155, 156, which are slidably mounted on guide-rods 157, 158, fixed in the drill-head.

The shifting sleeves are moved up and down on their guide-rods by suitable motion-transmitting means, preferably actuated by rocking members 159, 160, respectively. (See Figs. 5, 6 and 8.) These rocking members, exemplified respectively as a sleeve and as a shaft upon which the sleeve is rotatably mounted, are instanced as journaled respectively on the drill-head in bearings 161, 162, with their axes of rotation extending transversely of the drill-head. The motion-transmitting mechanism between the rocking members and the shifting sleeves 155, 156, preferably include racks 163, 164, on the shifting sleeves, and sector-gears 165, 166, fixed to the oscillating sleeve 159 and shaft 160 respectively.

The sector-gears are arranged to actuate the racks of the shifting-sleeves, either by meshing directly with the racks, as exemplified by a gear 165 and rack 163, or through the medium of a transmitting pinion 167, interposed between and meshing with the sector-gear 166 and the rack 164, at opposite sides of its axis of rotation. (See Fig. 10.) The shaft 168 of the transmitting pinion is fixed in a suitable bearing 169.

The oscillatory sleeve and shaft are preferably independently partially rotated in either direction by rack-rods 171, 172, instanced as provided with racks 173, 174, in meshing engagement with sector-gears 175, 176, fast upon the sleeve and shaft respectively. (See Figs. 5, 6, 8 and 10.) The rack-rods have guided axial movement in a housing 177.

The rack-rods have lower racks 178, 179, thereon, actuated by sector-gears 181, 182, which are instanced as rotatable with sleeves 183, 184, and respectively arranged for actuating meshing engagement with racks 178, 179, upon the rack-rods. (See Figs. 6 and 9.)

The sleeve 184 is on a stud-shaft 186 journaled in a bearing 187 in the frame, the sleeve being journaled in a bearing 188 of a cover-plate 189, of the housing 177, in which said sleeves are received, the said plate extending forwardly and having an index-plate 190 thereon. The sleeve 183 is journaled about the sleeve 184, and is held thereon by means of a collar 191 secured to the inner sleeve by a screw 192. The sector-gear 182 is on the collar 191.

An operating arm 194 extends from the sleeve 184, and an operating arm 195 extends from the sleeve 183, the operating arm 194 being received through a slot 196 in said sleeve-box.

Each of the operating arms has an axially movable handle 201 thereon, (see also Fig. 7). The handle is provided with a positioning lug 202 which is normally urged toward recesses 203 in the index-plate 190 by a spring 204, received in the bore 205 of said handle, between a shoulder 206 on the operating arm and the bottom wall of said bore. A pin 207 received through the arm and in slots 208 in the handle prevents turning of the handle, for insuring coactive relation between the lugs and recesses, which act as stops for positioning the operating arms in the relation for causing coaction between the gear elements of the variable speed and driving means for the drill-spindle.

In operation, when the driving gear 131 is operatively connected with the internal gear about the drill-spindle, a low speed ratio of rotation and feeding movement of the drill-spindle is obtained. If, on the other hand, the driving gear 132 is caused to mesh with the external gear 78 about the drill-spindle, a high speed ratio of rotation and feeding movement of the drill-spindle is obtained. When the driving gear is in operative relation with the external gear about the spindle, the large internal gear acts, with a fly-wheel effect upon the spindle for insuring uniformity of rotation at the high speeds.

The low speed ratio of rotation and the high speed ratio of rotation of the spindle may be varied by means of the variable speed gearing. Excessive speeds in the variable speed gearing are avoided on account of the marked difference in speed of the spindle obtained respectively by the external and internal gears. These various resultants of speed are transmitted through the feed gearing into speeds of axial or feeding movements of the spindle, the various speeds being multiplied by the variable speed mechanism instanced in the feeding mechanism.

Assuming that the driving gears 131, 132, rotate in a given direction, the operative connection of the driving means through said respective gears, respectively with the internal gear and the external gear about the spindle, cause opposite rotations of the spindle.

If now the shifting lever for shifting the clutch-collar 62 is direct-connected to said collar, as in the aforesaid application, directions of movement of said shifting lever are required when the spindle is driven by means of said internal gear, which are opposite to the directions of movement of said shifting lever required when the spindle is driven by means of said external gear. It would be necessary, therefore, for the operator to have continually in mind which gear is performing the driving of the spindle in order to know the proper direction of movement of the shifting lever for a given direction of rotation of the spindle.

In order to avoid this opposite movement of the operating part for effecting a given direction of movement in the drill-spindle, and to permit movement of the operating part in similar direction, regardless of whether the internal gear or external gear is driving the drill-spindle, I provide means actuated by a shiftable element of the mechanism causing selective driving connection with the internal and external gears, said means having connection with a shiftable element concerned in the rotations of said internal and external gears. In the present exemplification I provide the last-named shiftable element in the control means, whereby the control means is reversely affected by the operating handle when the spindle is driven by means of one of said gears than when driven by means of the other of said gears.

Instancing this arrangement, the operating handle 211 is fixed to a rocker-shaft 212, having an operating sleeve 213 thereon, respectively journaled in bearings 214, 215, of the rearwardly extending housing 68 of the tool-slide casing. (See Figs. 1, 2, 5, 6, 10 and 13). The sleeve is held against endwise movement in said bearings by means of a collar 216 fixed thereon, and the hub of the operating handle.

Segment bevel-gears 219, 220, rock loosely about the sleeve. A bevel-gear 221 meshes at opposite sides with said bevel segment gears. The bevel-gear 221 is fixed to a shaft 222, journaled in a bearing 223, in a stirrup 224, extending from the lugs 67 of said housing. A pinion 225 is fixed to said shaft and meshes with a rack 226, on the fork 63, for shifting the clutch-collar 62 lengthwise of the sleeve 41, for fixing either of the gears 46, 47, to said sleeve, for causing opposite rotations in the train of gearing connecting with the drill-spindle.

Connection is made between one of the shiftable elements of the speed-varying mechanism for the spindle and said controlling means for enabling similarity of direction of movement of the operating handle to effect similarity of direction of rotation of the spindle regardless of the operative relation in said speed-changing mechanism. This connection is exemplified as made with the shiftable sleeve 155, by providing said sleeve with a rack 231, (see Fig. 6), with which a sector-gear 232 meshes, the sector-gear being on a lever 233, pivoted by a bearing 234 on a pivot shoulder-bolt 235 threaded into a lug 236 extending from the casing. A segment-gear 237 is on said lever and meshes with a circular rack 238, on an axially movable rod 239, having a key 240 fixed thereto. The key 240 slides in a slot 241 extending lengthwise in the sleeve 213, and is arranged to selectively engage in key-slots 242, 243, in the respective segment bevel-gears 219, 220.

The sleeve 155 connects with the fork 151, which causes selective engagement of the driving gears with the internal gear and external gear about the spindle, this movement being effected by the arm 194.

Assuming the relation shown in Figs. 6 and 10, the operating arm 194 being in raised position, causes engagement of the driving pinion 131 with the internal gear, as shown in Figs. 3 and 13, and rotation of the drill-spindle in a given direction, resulting in a low speed ratio of the drill-spindle.

If now it is desired to change the rotation of the drill-spindle into a high speed ratio by operative connection with the external gear thereabout, the operating arm 194 is depressed, whereby the sleeves 133 and 155 are caused to descend, causing rocking movement of the lever 233 and raising of the axially movable rod 239, for disengaging the key from the key-slot 242 in the segment bevel-gear 219, and causing engagement of said key with the key-slot 243 in the segment bevel-gear 220.

When now the operating handle 211 is moved to cause operative relation in either of the driving clutches 48, 49, a given movement of said operating handle, when the key 240 is in the key-slot 242, will cause axial movement of the clutch-collar 62 in a direction opposite to the direction of its movement caused by said given movement of the operating handle when said key 240 is in engagement with the key-slot 243 in the opposed segment bevel-gear 220, so that said given direction of operation of the operating handle will effect the control means in such manner as to rotate the upright shaft 72 in opposite directions, when the driving gears 131, 132, are at their opposite limits of axial movement, for causing similarity of rotation in the drill-spindle, due to the meshing of said oppositely rotating driving gears at opposite sides of their axes of rotation respectively with the internal gear and the external gear about the drill-spindle, for transmitting the opposite rotations of said drive-shaft into similar rotations at the drill-spindle.

It will be noted that when the operating handle 211 is moved laterally for shifting either of the segment bevel-gears 219, 220, about their axes of rotation, that the other of said segment bevel-gears will be rotated in the opposite direction by means of the intermediate bevel-gear 221. The key-slots 242, 243, are in registry with the longitudinal slot 241 in the sleeve 213, when the operating arm is in neutral position, for placing the driving gears 131, 132, in neutral position between the internal gear and external gear about the spindle.

It is obvious that changes may be made in the present exemplification of my invention within the scope of the appended claims, without departing from the spirit of my invention.

Having thus fully described my invention, what I claim as new and desire to secure by Letters Patent, is:

1. In a drilling machine, the combination of a drill-spindle, an internal gear and an external gear about said drill-spindle for rotating the same, driving means, means selectively operatively connecting said driving means with said internal gear and said external gear, said last-named means including a shiftable member, a control member for causing reversals of rotation in said driving means, and a shiftable member with which said last-named shiftable member has operative connection whereby to reverse the control effect of said control-member in said reversals of rotation in said driving means.

2. In a drilling machine, the combination of a drill-spindle, feeding means for axially feeding the same, an internal gear and an external gear about said drill-spindle for rotating the same and actuating said feeding means, means selectively operatively connecting said driving means with said internal gear and said external gear, said last-named means including a shiftable member, a control member for causing reversals of rotation in said driving means, and a shiftable member with which said last-named shiftable member has operative connection whereby to reverse the control effect of said control-member in said reversals of rotation in said driving means.

3. In a drilling machine, the combination of a drill-spindle, an internal gear and an external gear about said drill-spindle for rotating the same, driving means therefor comprising a shiftable element, said driving means arranged for selective operative driving connection with said internal gear and said external gear, control means for the latter comprising a shiftable element, and connecting means between said shiftable elements for changing the control effect of said control means in said driving means.

4. In a drilling machine, the combination of a drill-spindle, feeding means for axially feeding the same, an internal gear and an external gear about said drill-spindle for rotating the same and actuating said feeding means, driving means arranged for selective operative connection with said internal gear and said external gear for rotating the same and including a shiftable element, a control means for the latter, said control means comprising a shiftable element, and means operatively connecting said shiftable elements whereby to reverse the control effect of said control means.

5. In a drilling machine, the combination of a drill-spindle, an external gear and an internal gear about said drill-spindle for rotating the same, driving means, means including a shiftable element for selectively operatively connecting said driving means with said internal gear and said external gear, means causing reversals of movements in said driving means, a control means for the latter, and means operatively connecting said shiftable element and said control means whereby to reverse the control effect of said control means.

6. In a drilling machine, the combination of a drill-spindle, an internal gear and an external gear about said drill-spindle for rotating the same, drive-gearing, means including a shiftable member for selectively operatively connecting said drive-gearing with said internal gear and said external gear, control means for the latter including reversing gearing, said control means comprising a shiftable element, and connecting means between said shiftable elements for reversing the operative effect of said reversing gearing.

7. In a drilling machine, the combination of a drill-spindle, means for rotating the same in reverse directions, control means for controlling the directions of said reversals comprising a manually operating device, a reversing connection therefor for reversing the control effect of said control means, and means for automatically moving said reversing connection.

8. In a drilling machine, the combination of a drill-spindle, means for rotating the same in reverse directions including a shiftable element, a manually controlled member arranged for causing reversals in directions of rotation of said drill-spindle, and means having connection with said shiftable element for automatically reversing the control effects of said manually controlled member upon said reversals in directions of rotation of said drill-spindle.

9. In a drilling machine, the combination of a drill-spindle, means for rotating said drill-spindle, and a plurality of means each causing reverse rotations of said drill-spindle, said plurality of reversing means being interconnected for automatically neutralizing the reversing effect of one of said reversing means upon said rotations of said drill-spindle by movement in another of said reversing means.

10. In a drilling machine, the combination of a drill-spindle, means for rotating the same including a reversing driving means, manual means for controlling the reversals in said reversing driving means, and automatic means acting on said last-named means for reversing the control effect by said last-named means.

11. In a drilling machine, the combination of a drill-spindle, an internal gear and an external gear about said spindle for rotating the same, driving means, a manual means for selectively causing operative connection of said driving means with said internal gear and said external gear, reversing means in said driving means, a manual control causing reversals in said reversing means, and connecting means between said first-named manual means and said manual control whereby to reverse the operative effect of said manual control on said reversing means in said driving means.

12. In a drilling machine, the combination of a drill-spindle, an internal gear and an external gear about said drill-spindle for rotating the same, manual means causing selective operative connection of said driving means with said internal gear and said external gear and including a shiftable element, said driving means including reversing means, a manual control for said reversing means including a shiftable element, and connecting means between said shiftable elements whereby said second-named shiftable element is automatically moved by said first-named shiftable element for reversing the control effect of said manual control on said reversing means of said driving means.

13. In a drilling machine, the combination of a drill-spindle, means for rotating the same including a shiftable element, a drive-shaft therefor, axially movable reversing means about said drive-shaft, a movable part having connection therewith, a rocker-part operatively connected with the latter, a bevel-gear therefor, a manually operated control part, a pair of bevel-gears operated thereby and meshing with said first-named bevel-gear, and means connected with said first-named shiftable element for selectively connecting said control part with the gears of said pair of bevel-gears.

14. In a drilling machine, the combination of a drill-spindle, an internal gear and an external gear about said drill-spindle for rotating the same, driving means for said drill-spindle, a manually movable part for selectively causing operative connection of said driving means with said internal gear and said external gear and comprising a shiftable element, said driving means including reversing gearing, a shiftable part for causing reversals therein, a rack thereon, a pinion in mesh with said rack, a bevel-gear rotating said pinion, an operating arm, a rock-shaft operated thereby, a pair of bevel-gears thereabout meshing at opposite sides with said first-named bevel-gear, a key selectively connecting with said pair of bevel-gears, and a key-operating part having operative connection with said first-named shiftable element.

15. In a drilling machine, the combination of a drill-spindle, an internal gear and an external gear about said drill-spindle for rotating the same, driving means, manual means for selectively operatively connecting said driving means with said internal gear and external gear and including a shiftable element, said driving means including reversing gearing, an operating part therefor, a control-arm, a rocking sleeve actuated thereby, a pair of bevel-pinions about said sleeve, an axially movable rod in said sleeve, a key thereon arranged to selectively connect with said bevel-gears, a bevel-gear between said pair of bevel-gears for actuating said operating part, said axially movable rod provided with a rack, said shiftable element provided with a rack, and a lever pivoted intermediate of its ends and provided with teeth at its respective ends engaging said respective racks, whereby to automatically shift said axially movable rod upon shifting of said first-named shiftable element.

In testimony whereof I have hereunto signed my name in the presence of two subscribing witnesses.

HERMAN W. SCHATZ.

Witnesses:
 THERESA M. SILBER,
 DAWSON E. BRADLEY.